United States Patent Office 3,810,769
Patented May 14, 1974

3,810,769
COMPOSITIONS OF COMPLEX PHOSPHATES
OF ALUMINIUM
John Geoffrey Blacker, Harrogate, and James Derek Birchall and John Edward Cassidy, Runcorn, England, assignors to Imperial Chemical Industries Limited, London, England
No Drawing. Filed Nov. 29, 1971, Ser. No. 203,032
Int. Cl. C08f 29/30; C08h 7/00, 11/00
U.S. Cl. 106—135        9 Claims

ABSTRACT OF THE DISCLOSURE

Compositions comprising complex phosphates of aluminium containing a halogen and chemically-bound molecules of a hydroxy compound, which may be water or an organic hydroxy compound, certain organic polymers and a solvent system. A typical composition comprises aluminium chlorophosphate ethanolate and polyvinyl butyral dissolved in a mixture of methanol and chloroform. The compositions are especially useful as coatings for substrates as they decompose on heating at low temperatures to form films of aluminium phosphate and an organic polymer.

The present invention relates to compositions of complex phosphates of aluminium and in particular to solutions of mixtures of complex aluminium phosphates and organic polymers.

In our copending United Kingdom patent application No. 29862/69 (corresponding to Dutch application No. 7008594) we described halogen-containing complex phosphates of aluminium containing at least one chemically-bound molecule of a hydroxy compound R—OH wherein R is a hydrogen atom or an organic group. We also disclosed that solutions of the complex phosphates could comprise organic materials, including certain organic polymers. The disclosures in the aforesaid application No. 29862/69 are incorporated herein by reference.

We have now found that the range of organic polymers usable in conjunction with the complex phosphates may be extended by suitable choice of a solvent system.

According to the present invention there is provided a composition comprising (a) a halogen-containing complex phosphate of aluminium containing at least one chemically-bound molecule of a hydroxy compound R—OH wherein R is a hydrogen atom or an organic group,
(b) an organic polymer or copolymer selected from the group consisting of diene polymers, vinyl polymers, vinylidene polymers, acrylic acid polymers, methacrylic polymers, aldehyde polymers, 1-2 epoxide polymers, phenoxy resins, polyacetals, chlorinated rubbers, polyesters, unsaturated polyesters, polysulphones, polyurethanes, natural polymers, modified natural polymers, cellulose esters, and polysiloxanes, and
(c) a solvent system adapted to codissolve the said complex phosphate and the said organic polymer. The term "phosphate" includes acid phosphates.

Where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex phosphates according to the invention containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethyl alcohol, n-propyl alcohol or isopropyl alcohol.

The halogen in the halogen-containing complex phosphate of aluminium is preferably chlorine, but the compounds may contain other halogens, for example bromine or iodine.

The ratio of the number of gram atoms of aluminium to the number of gram atoms of phosphorus in the complex phosphates of aluminium may vary over a wide range, for example from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of the invention may be monomeric or polymeric.

The structure of the complex phosphates is not fully understood and some of the chemically-bound hydroxy compounds may be bound as groups —OR rather than as complete molecules.

The monomeric forms, or the repeating units of the polymeric forms of the complex phosphates, may contain, for example, from one to five molecules of the hydroxy compound. Most frequently the number of molecules of the hydroxy compound is four. In some cases the complex phosphates may contain molecules of different hydroxy compounds, for example they may contain both chemically-bound water and a chemically-bound organic hydroxy compound, or the total number of such molecules being, for example, from two to five.

An example of a complex phosphate according to the invention is the complex phosphate containing ethyl alcohol and having the empirical formula $AlPClH_{25}C_8O_8$. The infrared and X-ray characteristics of the compound are described in Example 1 of the aforesaid co-pending application. This compound is designated aluminium chlorophosphate ethanolate, for convenience referred to herein as ACPE, but it is to be understood that this designation in no way implies any particular molecular structure for the compound.

An example of a complex phosphate containing chemically-bound water is the complex phosphate containing chemically-bound water having the empirical formula $AlPClH_{11}O_9$. The infrared and X-ray characteristics of the compound are described in Example 6 of the aforesaid co-pending application. This compound is designated aluminium chlorophosphate hydrate, for convenience referred to as ACPH, but it is to be understood that this designation in no way implies any particular molecular structure for the compound.

A further example of a complex phosphate is that containing bromine and ethyl alcohol having an empirical formula $AlPBrH_{25}C_8O_8$. The infra-red and X-ray characteristics of the compound are described in Example 7 of the aforesaid co-pending application. This compound is designated aluminium bromophosphate ethanolate, for convenience referred to as ABPH, but it is to be understood that this designation in no way implies any particular molecular structure for the compound.

Preferred diene polymers include polybutadiene and copolymers of butadiene and styrene. Preferred vinyl polymers include:

polyvinyl pyrrolidone
polyvinyl butyral
polyvinyl acetal
polyvinyl formal
polyvinyl alcohol
polyvinyl acetate
polyvinyl ether/maleic anhydride copolymer.

A preferred polyvinylidene polymer is polyvinylidene chloride. Of the acrylic acid and methacrylic polymers we prefer to use polyethylacrylates, polymethylmethacrylates, hydroxypropylacrylates and poly(N,N-dimethyl acrylamide). Preferred 1-2 epoxide polymers include poly(ethylene oxide) and poly(ethylene glycol). Useful natural polymers include shellac, gelatine, casein and copal resin. Preferred cellulose esters include cellulose sulphate, cellulose nitrate, cellulose acetate, cellulose acetate/butyrate and cellulose propionate.

The complex phosphate is dissolved in a solvent system which is a polar material, especially water or organic hydroxy compounds, and is preferably an oxygen-containing polar solvent. When the solvent system for the complex phosphate is not a solvent for the organic polymer, then mixed solvent systems may be used. The solvent for the organic polymer in such a mixed solvent system may be a nonsolvent for the complex phosphate and may even be nonpolar. It is found that when the complex phosphate and the organic polymer are dissolved in such a mixed solvent system a homogeneous solution is obtained. Mixed solvent systems are particularly useful when one of the components of the solvent system assists in the solubilization of the organic polymer.

In making these solutions it is preferable that the inorganic phase should not be heated above the decomposition temperature of the complex phosphate and in certain cases it may be necessary to dissolve the organic polymer at an elevated temperature and allow the solution to cool before adding and dissolving the inorganic material. For ACPE, for example, it should preferably not be added when the organic polymer solution temperature exceeds about 100° C. In some embodiments it is convenient to dissolve a monomer of the desired polymer in the solvent system and polymerize it later.

The compositions of the invention may conveniently comprise two or more organic polymers.

Additional components, for example pigments, colorants, surfactants, plasticizers, heat stabilizers, phase stabilizers, U.V. stabilizers or fillers may be dispersed or dissolved in the compositions according to the invention.

Particularly useful solvents are the lower aliphatic alcohols and such materials as chloroform, dimethyl formamide, dimethyl acetamide, and dimethyl sulphoxide may be admixed therewith. Methanol is a preferred solvent.

Examples of polymers which may be particularly useful in methanol include polyvinyl acetyl, polyvinyl acetate, polyvinyl ethyl ether, polyethyl acrylate, poly(N,N-dimethyl acrylamide) and poly(ethylene oxide).

Examples of suitable polymer/solvent combinations include polyvinyl butyral in methanol, polyvinyl acetal in methanol, polyvinyl chloride in methanol/tetrahydrofuran, polyacrylic acid in methanol, polymethyl acrylate in tetrahydrofuran, polyacrylic acid in methanol, polymethyl acrylate in tetrahydrofuran, polymethyl methacrylate in methanol/chloroform, polyacrylonitrile in dimethyl formamide/methanol, poly(3-phenoxylene) in dimethyl formamide/methanol, polyethylene oxide in methanol/chloroform, poly(1-butene sulphone) in methanol/acetone, polyethylene terephthalate in chloral hydrate/methanol, poly(hexamethylene carbonate) in chloroform/tetrahydrofuran, chlorinated rubber in ethyl acetate/ethanol, cellulose triacetate in methanol/chloroform, cellulose nitrate in methanol, poly(dimethyl siloxane) in chloroform/methanol.

The viscosities of the solutions may be varied by varying the ratios of the solutes, the overall concentration of the solutes, the molecular weight of the organic component and, in the case of mixed solvents, the ratios of the solvent components.

The compositions of the invention may be used in the fabrication of shaped articles, for example films and fibres, and for coatings or binders comprising aluminium phosphate and an organic polymer, since, on heating, the complex phosphate in the composition decomposes to aluminium phosphate. The temperature at which the aluminium phosphate forms depends upon the particular complex phosphate used, but is normally from 60° C. to 500° C. Thus compositions of the invention may be used to coat a substrate, for example glass, metals, ceramics or organic polymers, and the coating heated to form a film of aluminium phosphate comprising an organic polymer.

Fibres comprising aluminium phosphate and an organic polymer may be prepared by fibrizing a composition according to the invention and heating the fibres thereby produced.

In a further embodiment of the invention, compositions comprising a complex phosphate and an organic polymer may be used as a binder or adhesive for a wide variety of materials.

The invention is illustrated by, but not limited to, the following examples:

EXAMPLE 1

A complex aluminium phosphate was prepared by dissolving 100 g. of anhydrous aluminium chloride in 750 ml. of laboratory grade ethyl alcohol, cooling the resultant solution to 0° C. and adding 37.2 ml. of 88% orthophosphoric acid in a dropwise manner. The white crystalline complex aluminium phosphate was separated from the mixture and used to make a solution by dissolving 10 g. of the complex aluminium phosphate and 10 g. of polyvinyl pyrrolidone in 80 g. of methanol.

EXAMPLE 2

A solution was prepared by dissolving 5 g. of the complex aluminium phosphate, prepared as described in Example 1, and 5 g. of polyvinyl acetate in 90 g. of methanol.

EXAMPLE 3

A solution was prepared by dissolving 5 g. of the complex aluminium phosphate, prepared as described in Example 1, and 5 g. of polyacrylic acid in 40 g. of methanol.

EXAMPLE 4

A solution was prepared by dissolving 5 g. of the complex aluminium phosphate prepared as described in Example 1, and 5 g. of polymethylmethacrylate in 90 g. of an organic solvent comprising 4 parts by volume chloroform and 1 part by volume methanol.

EXAMPLE 5

A solution was prepared by dissolving 5 g. of the complex aluminium phosphate, prepared as described in Example 1, and 5 g. of poly(vinyl ether maleic anhydride) in 90 g. of an organic solvent comprising 4 parts by volume of tetrahydrofuran and 1 part by volume of methanol.

EXAMPLE 6

A solution was prepared by dissolving 10 g. of the complex aluminium phosphate, prepared as described in Example 1, and 10 g. of polyvinyl butyral in 80 g. of organic solvent comprising 4 parts by volume of chloroform and 1 part by volume of methanol.

EXAMPLE 7

A solution was prepared by dissolving 5 g. of the complex aluminium phosphate, prepared as described in Example 1, and 5 g. of poly(vinylidene chloride acrylonitrile) in 90 g. of an organic solvent comprising 4 parts by volume of tetrahydrofuran by volume of methanol.

EXAMPLE 8

A solution was prepared by dissolving 5 g. of the complex aluminium phosphate, prepared as described in Example 1, and 5 g. of polyvinyl chloride in 90 g. of an organic solvent comprising 4 parts by volume of tetrahydrofuran and 1 part by volume of methanol.

EXAMPLE 9

A solution was prepared by dissolving 5 g. of the complex aluminium phosphate, prepared as in Example 1, and 5 g. of polystyrene in 90 g. of an organic solvent comprising 4 parts by volume tetrahydrofuran and 1 part by volume of methanol.

EXAMPLE 10

A solution was prepared by dissolving 5 g. of the complex aluminium phosphate, prepared as in Example 1, and 5 g. of polyacrylonitrile in 90 g. of dimethyl formamide.

EXAMPLE 11

A solution was prepared by dissolving 5 g. of the complex aluminium phosphate, prepared as described in Example 1, and 5 g. of polyvinyl formal in 90 g. of an organic solvent comprising 4 parts by volume chloroform and 1 part by volume methanol.

EXAMPLE 12

A solution was prepared by dissolving 11 g. of the complex aluminium phosphate, prepared as described in Example 1, and 1.6 g. of polyethylene oxide in 87.4 g. of an organic solvent comprising 1 part by weight of chloroform to 1 part by weight of methanol.

EXAMPLE 13

A solution was prepared by dissolving 5 g. of the complex aluminium phosphate, prepared as in Example 1, and 9 g. of cellulose acetate in 86 g. of an organic solvent comprising 4 parts by volume of chloroform and 1 part by volume of methanol.

EXAMPLE 14

A solution was prepared by dissolving 5 g. of the complex aluminium phosphate, prepared as in Example 1, and 5 g. of cellulose acetate-butyral in 90 g. of an organic solvent comprising 4 parts by volume of chloroform and 1 part by volume of methanol.

What we claim is:
1. A composition comprising:
   (a) a halogen-containing complex phosphate of aluminium containing at least one chemically bound molecule of a hydroxy compound R—OH where R is a hydrogen atom or an organic group containing one to ten carbon atoms, the ratio of the number of gram atoms of aluminium to the number of gram atoms of phosphorus in the complex being from 1:2 to 2:1 and the number of molecules of the hydroxy compound in the monomeric phosphate being from 1 to 5;
   (b) an organic polymer or copolymer selected from the groups consisting of diene polymers, vinyl polymers, vinylidene polymers, acrylic acid polymers, methylacrylic polymers, polyaldehydes, polyethylene oxide, polyethylene glycol, chlorinated rubber, polyesters, polysulphones, polyurethanes, cellulose esters, polysiloxanes and natural polymers selected from shellac, gelatine, casein and copal resin;
   (c) a solvent system adapted to codissolve the complex phosphate and organic polymer or copolymer, selected from the group consisting of water, organic oxygen-containing polar solvents, and chloroform or mixtures thereof.

2. A composition as claimed in claim 1 wherein the complex phosphate contains chemically-bound ethyl alcohol and has the empirical formula $AlPClH_{25}C_8O_8$.

3. A composition as claimed in claim 1 wherein the complex phosphate contains chemically-bound methanol.

4. A composition as claimed in claim 1 wherein the complex phosphate contains chemically-bound water.

5. A composition as claimed in claim 1 wherein the vinyl polymer is polyvinyl pyrrolidone, polyvinyl alcohol, polyvinyl butyral, polyvinyl formal, polyvinyl acetal, polyvinyl acetate or polyvinyl ethyl ether.

6. A composition as claimed in claim 1 wherein the methacrylic polymer is polymethylmethacrylate.

7. A composition as claimed in claim 1 wherein the cellulose ester is cellulose sulphate, cellulose acetate, cellulose acetate/butyrate or cellulose propionate.

8. A composition as claimed in claim 1 wherein the solvent system comprises a lower aliphatic alcohol.

9. A composition as claimed in claim 1 wherein the solvent system comprises chloroform, dimethyl formamide, dimethyl acetamide or dimethyl sulphoxide.

References Cited

UNITED STATES PATENTS 2,885,417   5/1959   Heyden ---------- 260—431 P

ALLAN LIEBERMAN, Primary Examiner

U.S. Cl. X.R.

106—146, 177, 186, 236, 237, 238; 260—29.2 R, 29.2 M, 29.2 TN, 29.2 E, 29.6 R, 29.6 H, 29.6 BM, 29.6 M, 29.6 MM, 29.6 MP, 29.7 P, 30.4 R, 30.4 A, 30.4 SB, 30.8 OS, 31.2 R, 31.2 MR, 31.2 XA, 32.6 R, 32.6 A, 32.8 R, 32.8 A, 32.8 SB, 33.4 R, 33.4 SB, 33.4 UR